United States Patent
Gu et al.

(10) Patent No.: US 11,819,942 B2
(45) Date of Patent: Nov. 21, 2023

(54) METHOD AND APPARATUS FOR APPLYING AN ACTIVE JOINING FORCE DURING LASER WELDING OF OVERLAPPING WORKPIECES

(71) Applicant: Magna International Inc., Aurora (CA)

(72) Inventors: Hongping Gu, Aurora (CA); Aldo Van Gelder, Aurora (CA)

(73) Assignee: Magna International Inc.

( * ) Notice: Subject to any disclaimer, the term of this patent is extended or adjusted under 35 U.S.C. 154(b) by 59 days.

(21) Appl. No.: 17/524,870

(22) Filed: Nov. 12, 2021

(65) Prior Publication Data

US 2022/0184737 A1 Jun. 16, 2022

Related U.S. Application Data

(60) Provisional application No. 63/123,990, filed on Dec. 10, 2020.

(51) Int. Cl.
*B23K 26/21* (2014.01)
*B23K 26/70* (2014.01)

(52) U.S. Cl.
CPC ............ *B23K 26/21* (2015.10); *B23K 26/702* (2015.10)

(58) Field of Classification Search
CPC ...... B23K 26/02; B23K 26/21; B23K 26/702; B29C 66/349
See application file for complete search history.

(56) References Cited

U.S. PATENT DOCUMENTS

| 5,049,720 A | 9/1991 | Fang et al. |
| 5,120,926 A | 6/1992 | Marriott |
| 6,172,323 B1 | 1/2001 | Ishide et al. |
| (Continued) | | |

FOREIGN PATENT DOCUMENTS

| CN | 201151190 | 11/2008 |
| CN | 102079135 A | 6/2011 |
| (Continued) | | |

OTHER PUBLICATIONS

Machine Translation of Ravier/Chotard FR 3022479 performed on Mar. 9, 2023 (Year: 2015).*

(Continued)

*Primary Examiner* — Brian W Jennison
(74) *Attorney, Agent, or Firm* — Aventum IP Law LLP

(57) ABSTRACT

A pressing device for a laser welding apparatus includes an arm member with opposite mounting and pressing ends. A pressing pad at the pressing end has an opening for allowing a laser beam to irradiate a workpiece assembly that is being pressed by the pressing device. The mounting end has a mounting structure for detachably securing the pressing device to the laser welding apparatus. The arm member is shaped to position the opening at a known fixed distance from a laser source of the laser welding apparatus. The pressing pad has a pressing surface on a workpiece-facing side thereof for applying a joining force to the workpiece assembly at a welding location. At least one of the size, shape and smoothness of the pressing surface allows a sliding-contact movement of the pressing surface along a surface of the workpiece assembly during application of the pressing force.

13 Claims, 13 Drawing Sheets

(56) References Cited

U.S. PATENT DOCUMENTS

| | | |
|---|---|---|
| 6,966,968 B2 | 11/2005 | Chen et al. |
| 7,211,166 B2 | 5/2007 | Chen et al. |
| 7,223,315 B2 | 5/2007 | Chen |
| 7,785,687 B2 | 8/2010 | Ando |
| 7,960,003 B2 | 6/2011 | Kihara et al. |
| 8,075,725 B2 | 12/2011 | Hofmann et al. |
| 8,084,709 B2 | 12/2011 | Scheidt et al. |
| 8,413,701 B2 | 4/2013 | Lee et al. |
| 9,180,612 B2 | 11/2015 | Kerbiguet et al. |
| 9,393,738 B2 | 7/2016 | Kugelmann et al. |
| 9,878,490 B2 | 1/2018 | Butzke et al. |
| 10,286,608 B2 | 5/2019 | Watanabe et al. |
| 2004/0118818 A1* | 6/2004 | Oda ............... B23K 26/067 219/121.64 |
| 2005/0039855 A1 | 2/2005 | Chen et al. |
| 2005/0218123 A1 | 10/2005 | Hayakawa et al. |
| 2006/0060304 A1 | 3/2006 | Chen et al. |
| 2009/0001054 A1 | 1/2009 | Mizuno et al. |
| 2009/0294047 A1 | 12/2009 | Kurosaki et al. |
| 2011/0200791 A1 | 8/2011 | Kugelmann et al. |
| 2011/0259857 A1* | 10/2011 | Johnson ............ B23K 26/037 219/121.63 |
| 2014/0283987 A1 | 9/2014 | Contractor et al. |
| 2018/0111327 A1 | 4/2018 | Watanabe et al. |
| 2021/0268601 A1 | 9/2021 | Gubler |

FOREIGN PATENT DOCUMENTS

| | | | |
|---|---|---|---|
| CN | 102107530 A | 6/2011 | |
| CN | 101486255 | 1/2012 | |
| CN | 101486255 B | 1/2012 | |
| CN | 202480377 U | 10/2012 | |
| CN | 102909858 A | 2/2013 | |
| CN | 203818576 | 9/2014 | |
| CN | 204382658 | 6/2015 | |
| CN | 102909859 B | 4/2016 | |
| CN | 103935044 A | 1/2017 | |
| CN | 107584770 A | 1/2018 | |
| CN | 108943739 A | 12/2018 | |
| CN | 109228368 A | 1/2019 | |
| CN | 109848591 | 6/2019 | |
| CN | 208993119 U | 6/2019 | |
| CN | 110077000 | 8/2019 | |
| CN | 102672350 | 9/2019 | |
| CN | 110625949 A | 12/2019 | |
| CN | 209716802 | 12/2019 | |
| CN | 110814518 A | 2/2020 | |
| CN | 210100741 | 2/2020 | |
| CN | 108819292 A | 9/2020 | |
| CN | 108724739 B | 10/2020 | |
| DE | 102009043376 A | 4/2011 | |
| DE | 102009043376 A1 * | 4/2011 | ............ B29C 65/16 |
| EP | 4319742 | 12/1994 | |
| EP | 1060837 A3 | 11/2001 | |
| EP | 1405713 B1 | 4/2004 | |
| EP | 1440784 A1 | 7/2004 | |
| EP | 1987944 | 11/2008 | |
| EP | 2116355 B1 | 11/2009 | |
| EP | 2607056 A1 | 6/2013 | |
| EP | 2321115 B1 | 4/2014 | |
| EP | 2087989 B1 | 7/2017 | |
| EP | 2566683 B1 | 10/2017 | |
| FR | 2952316 A1 | 5/2011 | |
| FR | 2983768 | 11/2014 | |
| FR | 3022479 A1 * | 12/2015 | ............ B29C 65/16 |
| JP | 9070680 | 7/1982 | |
| JP | S58163587 A | 9/1983 | |
| JP | 61102238 A | 5/1986 | |
| JP | 9327781 | 12/1997 | |
| JP | 2002248688 A | 9/2002 | |
| JP | 2003123506 | 4/2003 | |
| JP | 2004114437 A | 4/2004 | |
| JP | 2004349123 A | 12/2004 | |
| JP | 201566750 A | 9/2010 | |
| JP | 20055081396 A2 | 3/2015 | |
| JP | 2016083853 | 5/2016 | |
| JP | 2018202861 A5 | 5/2019 | |
| JP | 2017042774 A | 2/2020 | |
| KR | 100986074 B1 | 3/2010 | |
| KR | 20100029975 | 3/2010 | |
| KR | 100990928 B1 | 11/2010 | |
| WO | 2012080082 | 6/2012 | |
| WO | 2019016172 A | 1/2019 | |
| WO | 2019088058 A1 | 5/2019 | |

OTHER PUBLICATIONS

Machine Translation of Wagner DE 10 2009 043 376 performed on Mar. 9, 2023 (Year: 2011).*

* cited by examiner

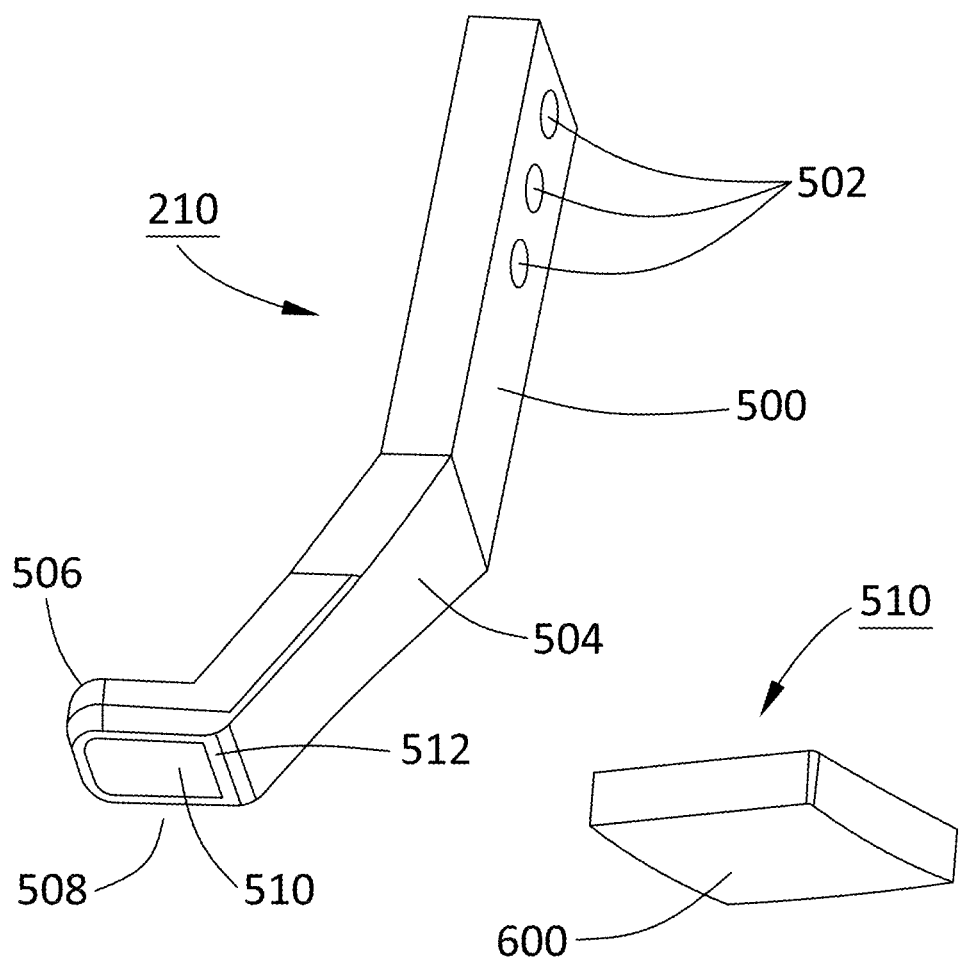
Figure 5
Figure 6a
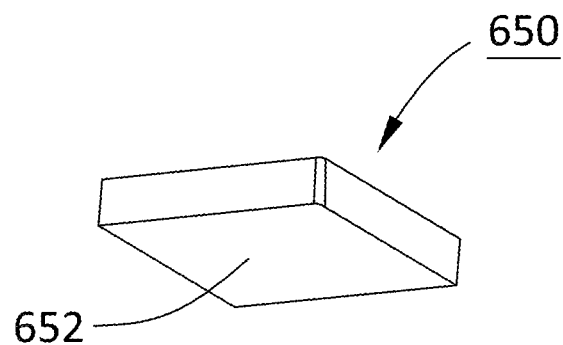
Figure 6b

METHOD AND APPARATUS FOR APPLYING AN ACTIVE JOINING FORCE DURING LASER WELDING OF OVERLAPPING WORKPIECES

FIELD OF THE INVENTION

The present disclosure relates generally to methods and apparatuses for laser welding of workpieces made from plastic or another suitable material. More particularly, the present disclosure relates to a method and apparatus in which a pressing arm is used to apply a joining force to a location that is being welded.

BACKGROUND

Methods for joining together plastic workpieces with the aid of a laser beam are known and referred to as transmission welding. The plastic workpieces are held together by a clamping or joining force in the region that is to be joined while the laser beam is moved relative to the workpieces. The laser beam passes through a first (e.g., top) workpiece, which is transparent to the laser radiation, and is absorbed at a surface of a second (e.g., bottom) workpiece that is in contact with the first workpiece. Heat is generated at the surface of the second workpiece when the laser radiation is absorbed, and some of this generated heat is transferred to the surface of the first workpiece that is in close contact with the second workpiece under the applied clamping force. This heating causes the material at the surfaces of the first and second workpieces to melt. When an adequate clamping force is applied, the gap between the two workpieces is sufficiently small to permit intermingling of the melted materials and a reliable bond is formed upon subsequent cooling and solidification of the material in the joined region.

It is important that the workpieces are clamped together during the welding operation, since a key requirement for producing a good quality welded joint of the plastics by means of laser radiation is not only the energy dosing, but also the clean and mechanical contact between the two joint surfaces that are to be connected to one another. Various methods and devices that are capable of applying an adequate contact force are known for the purpose, however this requirement is difficult to achieve consistently for large sized molded parts under normal welding conditions.

One prior approach uses a laser processing head with an integrated roller element, such as described in CN102079135 and CN101486255. The roller element is fabricated from a material that is transparent to the wavelength of laser radiation used during the welding operation. A pressing force is applied to the workpieces that are being welded together via the roller element, which is sufficient to close the gap between the individual workpieces, while at the same time the laser beam passes through the roller element and causes heating at the surfaces adjacent the gap. As the laser processing head moves along the weld direction, the roller element rolls along the workpieces such that pressure is always applied at the point where the welding is occurring. Advantageously, the roller element may be steered or guided along different paths for joining together components of different shapes and sizes. A disadvantage of this approach is that a complicated mounting structure is needed to rotationally mount the roller element in such a way that does not interfere with transmission of the laser beam through the roller element. In addition, the mounting structure must be sufficiently robust to allow the roller element to roll while under the load of the clamping force.

Another prior approach uses a fixture that is designed for welding together a specific set of workpieces, such as described in CN110814518. The workpieces that are to be welded together are sandwiched between a carrier and a pressure block assembly. The pressure block assembly is configured to press the workpieces together and has a laser beam channel defined between inner and outer portions thereof and aligned with the desired welding location. During use, a laser beam is directed into the laser beam channel and is reflected from a mirrored surface thereof toward the location that is to be welded together, whilst joining force is applied via the pressure block assembly to ensure close contact between the workpieces. Advantageously, force can be applied over the entire assembly of workpieces that are to be welded together. Unfortunately, a different fixture must be produced for each different product that is to be formed. In addition, the inner and outer portions of the pressure block assembly are connected via a pair of joints that interrupt the through-groove and accordingly produce discontinuities in the weld that is formed. Further, the effectiveness of this type clamping mechanism is limited to workpiece assemblies that have relatively simple geometries.

It would be beneficial to provide methods and apparatuses that overcome at least some of the above-mentioned disadvantages and/or limitations.

SUMMARY OF THE INVENTION

In accordance with an aspect of at least one embodiment there is provided a laser welding apparatus for welding together a workpiece assembly comprising a first workpiece that is arranged in an at least partially overlapping relationship with a second workpiece, the apparatus comprising: a laser optic unit for providing a beam of laser light for forming a weld joint between the first workpiece and the second workpiece in the workpiece assembly; an arm member having a pressing pad with an opening defined therethrough, the arm member being shaped such that the opening in the pressing pad is arranged at a known fixed distance from the laser optic unit to provide an optical path between the laser optic unit and the workpiece assembly, the pressing pad having a pressing surface on a workpiece-facing side thereof for applying a joining force to the workpiece assembly at the welding location during the laser welding; and means for moving the pressing pad in a welding direction relative to the workpiece assembly; wherein at least one of a size, a shape and a smoothness of the pressing surface is configured to support a sliding-contact movement of the pressing surface along a surface of the workpiece assembly during simultaneous application of the joining force.

In an embodiment, the arm member is fabricated from a wear-resistant material, and wherein at least a portion of the pressing surface is defined by a polished workpiece-facing surface of the wear-resistant material of the arm member.

In an embodiment, the wear-resistant material is a hard metal.

In an embodiment, the wear-resistant material is selected from the group consisting of: tool steel and ceramic material.

In an embodiment, the pressing surface is contained in a single plane and extends continuously around the opening.

In an embodiment, the pressing surface is contained in a single plane and extends around the opening with at least one discontinuity in said pressing surface, the at least one discontinuity arranged along a trailing edge of the pressing pad relative to the welding direction.

In an embodiment, the at least one discontinuity comprises a channel-like recess formed in the workpiece-facing surface of the wear-resistant material of the arm member, and wherein the channel-like recess provides clearance for a weld bead that is created during the laser welding.

In an embodiment, the at least one discontinuity comprises a gap formed in the wear-resistant material of the arm member such that the pressing pad is generally U-shaped or generally C-shaped.

In an embodiment, the pressing pad comprises an optical component disposed within the opening.

In an embodiment, the optical component is a lens having a polished workpiece-facing surface that is aligned flush with the polished workpiece-facing surface of the wear-resistant material of the arm member, and wherein at least another portion of the pressing surface is defined by the polished workpiece-facing surface of the lens.

In an embodiment, the pressing pad comprises an optical component disposed within the opening.

In an embodiment, the optical component is a cylindrical lens having a polished, curved surface that protrudes from the workpiece-facing side of the pressing pad, and wherein the pressing surface is defined by a portion of the polished, curved surface.

In an embodiment, the apparatus includes a mount for mounting the laser welding apparatus as an end effector of an articulated arm robot, and wherein the means for moving the pressing pad in the welding direction relative to the workpiece assembly is the articulated arm robot.

In an embodiment, the apparatus includes a linear actuator disposed between the mount and a sub-assembly that includes the laser optic unit, wherein the linear actuator is for extending and retracting the sub-assembly relative to the mount for controllably varying the joining force that is applied to the workpiece assembly.

In an embodiment, the linear actuator is an air cylinder or a hydraulic cylinder.

In an embodiment, the arm member is detachably secured via releasable mounting structures to support swapping of the arm member with a different arm member.

In an embodiment, the arm member is reversibly deflectable upon application of a joining force that exceeds a predetermined maximum joining force for the workpiece assembly.

In accordance with an aspect of at least one embodiment there is provided a method, comprising: arranging a first workpiece in an at least partially overlapping relationship with a second workpiece to form a workpiece assembly to be joined together; applying a joining force at a welding location using a pressing device of a laser welding apparatus, the pressing device including an arm member having a pressing pad with an opening defined therethrough, the arm member being shaped such that the opening in the pressing pad is arranged at a known fixed distance from a laser optic unit of the laser welding apparatus to provide an optical path between the laser optic unit and the workpiece assembly, the pressing pad having a pressing surface on a workpiece-facing side thereof for applying the joining force to the workpiece assembly at the welding location during the laser welding; during application of the joining force, irradiating the welding location by directing a beam of laser light from the laser optic unit toward the welding location via the opening in the pressing pad; and moving the pressing pad relative to the workpiece assembly along a welding direction, with a sliding-contact movement between the pressing surface and a contact surface of the workpiece assembly, while simultaneously applying the joining force and irradiating, so as to form a connection between the first workpiece and the second workpiece along the welding direction.

In an embodiment, the first workpiece is fabricated from a plastic material and wherein the laser beam propagates through the first workpiece to cause heating at an interface between the first work piece and the second workpiece so as to join the first workpiece and the second workpiece by laser transmission welding.

In an embodiment, the second workpiece is fabricated from a material selected from the group comprising a plastic material that absorbs the laser radiation; a plastic material that does not absorb the laser radiation and with a surface coating of a material that does absorb the laser radiation; a ceramic; a metal or a metal alloy.

In an embodiment, wherein the pressing surface remains in continuous contact with the contact surface of the workpiece assembly during the irradiating, so as to form a continuous connection between the first plastic workpiece and the second plastic workpiece along the welding direction.

In accordance with an aspect of at least one embodiment there is provided a pressing device for a laser welding apparatus, comprising: an arm member having a mounting end and an opposite pressing end, the pressing end defining a pressing pad having an opening extending therethrough for allowing a beam of laser light to impinge upon a workpiece assembly that is being pressed by the pressing device, the mounting end having a mounting structure for detachably securing the pressing device to the laser welding apparatus, the arm member being shaped to position the opening in the pressing pad at a known fixed distance from a laser optic unit of the laser welding apparatus, and the pressing pad having a pressing surface on a workpiece-facing side thereof for applying a joining force to the workpiece assembly at a welding location during the laser welding; wherein at least one of a size, a shape and a smoothness of the pressing surface is configured to support a sliding-contact movement of the pressing surface along a surface of the workpiece assembly during application of the pressing force.

In an embodiment, the arm member is fabricated from a wear-resistant material, and wherein at least a portion of the pressing surface is defined by a polished workpiece-facing surface of the wear-resistant material of the arm member.

In an embodiment, the wear-resistant material is a hard metal.

In an embodiment, the wear-resistant material is selected from the group consisting of: tool steel and ceramic material.

In an embodiment, the pressing surface is contained in a single plane and extends continuously around the opening.

In an embodiment, the pressing surface is contained in a single plane and extends around the opening with at least one discontinuity in said pressing surface, the at least one discontinuity arranged along a trailing edge of the pressing pad relative to the welding direction.

In an embodiment, the at least one discontinuity comprises a channel-like recess formed in the workpiece-facing surface of the wear-resistant material of the arm member, and wherein the channel-like recess provides clearance for a weld bead that is created during the laser welding.

In an embodiment, the at least one discontinuity comprises a gap formed in the wear-resistant material of the arm member such that the pressing pad is generally U-shaped or generally C-shaped.

In an embodiment, the pressing pad comprises an optical component disposed within the opening.

In an embodiment, the optical component is a lens having a polished workpiece-facing surface that is aligned flush with the polished workpiece-facing surface of the wear-resistant material of the arm member, and wherein at least another portion of the pressing surface is defined by the polished workpiece-facing surface of the lens.

In an embodiment, the pressing pad comprises an optical component disposed within the opening.

In an embodiment, the optical component is a cylindrical lens having a polished, curved surface that protrudes from the workpiece-facing side of the pressing pad, and wherein the pressing surface is defined by a portion of the polished, curved surface.

BRIEF DESCRIPTION OF THE DRAWINGS

Embodiments will now be described by way of example only, and with reference to the attached drawings, wherein similar reference numerals denote similar elements throughout the several views, and in which:

FIG. 5 is a simplified perspective view of a pressing arm with pressing pad including a cylindrical lens according to an embodiment.

FIG. 6a is a simplified perspective view of the cylindrical lens removed from the pressing arm of FIG. 5.

FIG. 6b is simplified perspective view of an alternative optical component for being mounted within the opening of the pressing arm, in the form of a lens having a substantially planar, polished surface.

DETAILED DESCRIPTION OF THE DRAWINGS

The following description is presented to enable a person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed but is to be accorded the widest scope consistent with the principles and features disclosed herein.

Figure 1:
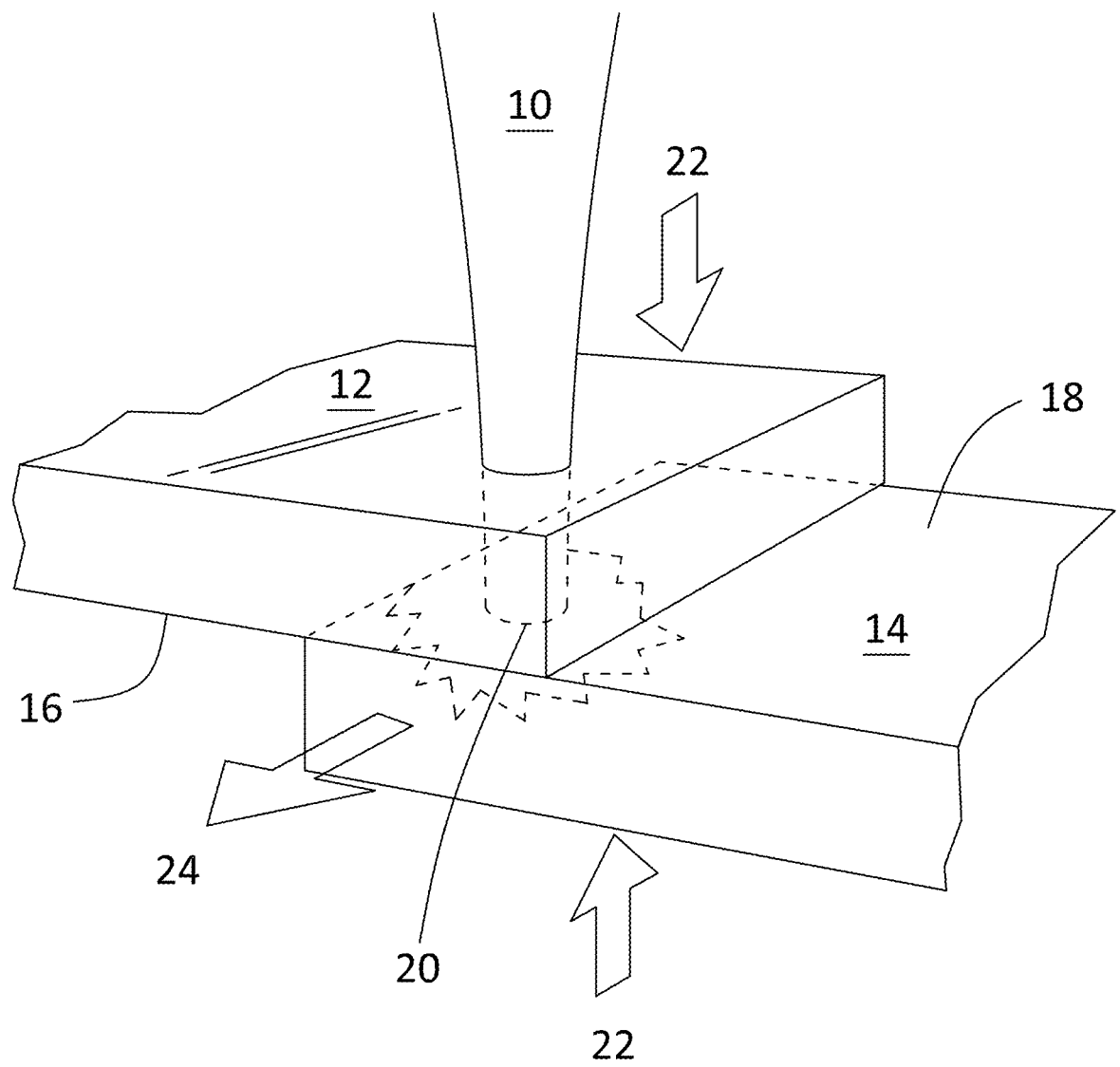
FIG. 1 is a simplified diagram showing the principle of joining together two pieces of plastic using laser transmission welding.

FIG. 1 is a simplified diagram showing the principle of joining together two workpieces using laser transmission welding. In the example that is shown in FIG. 1 the laser beam 10 comprises radiation within the infrared (IR) region of the electromagnetic spectrum. A first (e.g., top) workpiece 12 fabricated from an IR-transparent material is arranged relative to a second (e.g., bottom) workpiece 14 fabricated from an IR-absorbing material. In the specific and non-limiting example that is shown in FIG. 1, the first and second workpieces are plastic workpieces. A lower surface 16 of the first workpiece 12 is arranged in a facing relationship with an upper surface 18 of the second workpiece 14 for forming a lap joint. The laser beam 10 passes through the first workpiece 12 and impinges upon the upper surface 18 of the second workpiece 14 at a welding location 20 at an interface between the two workpieces. Laser radiation is absorbed at the upper surface 18 of the second workpiece 14 causing heat to be generated, and some of this heat is transferred to the lower surface 16 of the first workpiece 12. Simultaneously with being irradiated, the upper surface 18 of the second workpiece 14 and the lower surface 16 of the first workpiece 12 are brought into close contact with one another by the application of a joining force 22, which allows melted and/or softened material from the surfaces 16 and 18 to intermingle. Upon cooling, the intermingled material forms a secure connection between the first workpiece 12 and the second workpiece 14. The joining process continues along a welding direction 24 in order to form a desired connection between the first workpiece 12 and the second workpiece 14.

The second workpiece 14 may be fabricated substantially entirely from the IR-absorbing material, in which case the first workpiece 12 and the second workpiece 14 are fabricated from dissimilar materials. Alternatively, by way of another non-limiting example, the second workpiece may be fabricated substantially entirely from e.g., the same IR-transparent material as the first workpiece 12 and have only a surface layer that is fabricated from the IR-absorbing material. According to this alternative configuration, the first workpiece 12 and the second workpiece 14 may be fabricated substantially entirely from similar materials with only a thin IR-absorbing layer being provided between the facing surfaces thereof for generating the heat that is necessary to form the connection between the workpieces. Further alternatively, by way of yet another non-limiting example, the second workpiece may be fabricated from a non-plastic, but IR-absorbing material, such as for instance a ceramic or metal workpiece. Other suitable configurations may also be envisioned by a person having ordinary skill in the art.

The process that is illustrated in FIG. 1 depicts the application of a joining force 22 in only a very general way. In practice, the means that are used to provide the joining force 22 should satisfy a number of criteria. More particularly, the joining force 22 should be applied in such a way that a gap between the first workpiece 12 and the second workpiece 14 at the welding location 20 is sufficiently small to form a good connection. The joining force 22 should also be applied in such a way that the gap between the first workpiece 12 and the second workpiece 14 continues to be sufficiently small as the welding location 20 moves along the welding direction 24. In addition, the joining force 22 should also be applied in such a way that the welding process is uninterrupted along the welding direction 24, i.e., the means for applying the joining force 22 should not be disposed along the welding contour. Preferably, the means that are used to apply the joining force 22 are simple, robust and easily serviced.

In practice, difficulties may be encountered when attempting to join together workpieces, such as for instance two plastic workpieces, using the process that is illustrated in FIG. 1, especially when joining together large-sized molded thermoplastic components that may have a large dimensional variation or shape tolerance. Such dimensional variation poses a particular challenge for bringing the workpieces together in close contact with each other along the entire contour that is to be welded. As discussed supra a complicated fixture may be required to clamp together the workpieces, which may involve many clamping points along the contour that is to be welded. Thus, the clamping mechanism is likely to interfere with the welding path or block the laser beam from reaching the joining interface. On the other hand, systems that use an optically transparent roller to press against the workpieces, whilst the laser beam passes therethrough, also suffer from various drawbacks because the structure that is required to mount the roller may be bulky and therefore prevent access to narrow welding spaces.

Embodiments of the instant invention, which will be discussed in greater detail below, apply a joining force via a pressing arm having a pressing pad. The pressing pad has a pressing surface, which can be brought into contact with the top surface of an assembly of workpieces during the process of joining the workpieces together. An opening is defined through the pressing pad, the opening being sized to allow a laser beam to pass therethrough and to impinge upon the top surface of the assembly of workpieces. A transparent element, such as for instance a cylindrical lens, may be accommodated within the opening in which case the pressing surface may be a polished surface of the cylindrical lens protruding outwardly from the opening. Alternatively, the opening may simply be an airspace, in which case the pressing surface may be polished material of the pressing arm that is adjacent to and surrounding the opening. Further alternatively a lens may be accommodated within the opening, with a surface thereof being aligned flush with the polished material of the pressing arm, such that the pressing surface is defined partly by the surface of the lens and partly by polished material of the pressing arm that is adjacent to and surrounding the opening.

During use, the pressing surface is pressed against a surface of the assembly of workpieces to provide the required joining force that is needed to reduce the size of a gap between the workpieces, and a laser beam is directed through the opening in the pressing pad to form the connection between the workpieces. It has been discovered that the surface of a molded thermoplastic workpiece is normally sufficiently slippery to allow the pressing pad to be moved there-along with a sliding-contact movement, even when the pressing pad is being used to exert a high pressing force on the workpiece. A robot or another suitable system may be used to slide the pressing pad along a desired joining contour along a welding direction, whilst continuing to apply the joining force, simultaneously with directing a laser beam through the opening of the pressing pad. The joining force that is applied via the pressing pad is sufficient to reduce the size of the gap at the interface between the workpieces that are being joined together, at the instantaneous location along the joining contour that is being irradiated by the laser, thereby ensuring a good quality connection between the workpieces.

Figure 2:
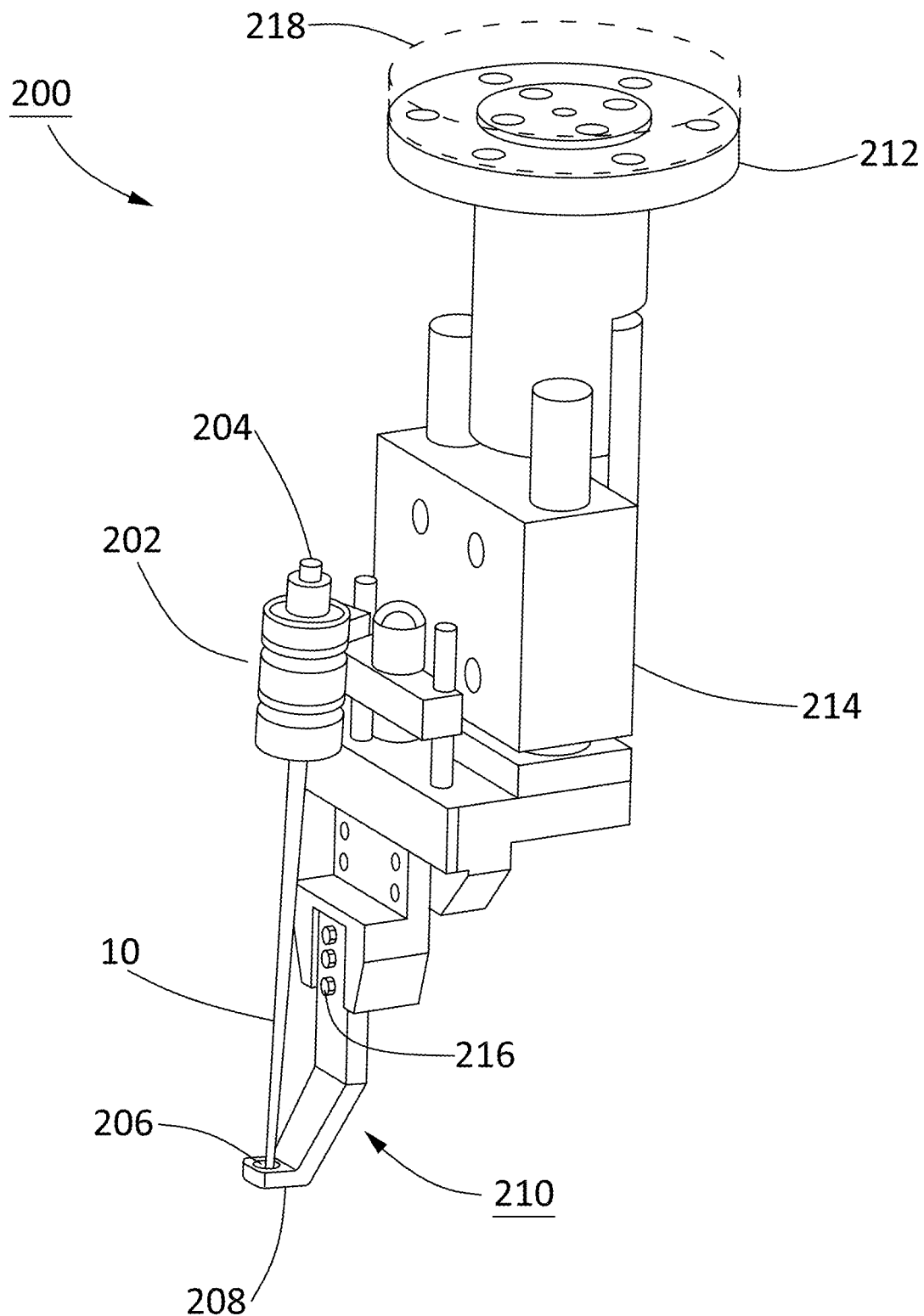
FIG. 2 is a simplified perspective view of an apparatus according to an embodiment.

Referring now to FIG. 2, shown is a simplified perspective view of an apparatus 200 according to an embodiment. In particular, the apparatus 200 includes an optical unit 202 including an assembly of beam shaping optics, which receives laser light from e.g. a not-illustrated optical fiber coupled to optical fiber connector 204 and forms a collimated laser beam 10. The collimated laser beam 10 is directed through an opening 206 in a pressing pad 208 of an arm member, i.e., pressing arm 210. The pressing arm 210 maintains a known, fixed distance of separation between the optical unit 202 and the pressing pad 208. Advantageously, the beam shaping optics can be configured to optimize the spot size of laser beam 10 for the welding process and/or to fit entirely within the opening 206 of the pressing pad 208. Of course, the assembly of beam shaping optics and the optical fiber are well known in the art of laser transmission welding and therefore will not be discussed in detail herein.

The apparatus 200 further includes a robot mount 212 for mounting the apparatus 200 as an end effector on an articulated arm robot, or on another suitable type of robot, for automated operation. For instance, the apparatus 200 may be mounted as an end effector on a robotic arm with five or more axes of movement. Using such a robotic system, the apparatus 200 may be moved in three mutually perpendicular directions for joining together parts that have complex three-dimensional shapes. An air cylinder 214, or another suitable actuator such as for instance a miniature hydraulic cylinder, is provided between the robot-mount end and the pressing-arm end of the apparatus 200. As will be apparent, the optical unit 202 and the pressing arm 210 are moved together such that the distance therebetween remains constant. The air cylinder 214 may be extended to urge the pressing pad 208 into contact with the plastic workpieces that are being welded together for providing the active joining force that is necessary to form a good connection therebetween. In addition, the active joining force allows for dimensional variation of the parts absent modifying the process path.

The pressing arm 210 is a replaceable component and accordingly the pressing arm 210 is detachably mounted in the apparatus 200, such as for instance using a plurality of (e.g., three) mechanical fasteners (e.g., machine bolts) 216. When the pressing arm 210 becomes worn, or alternatively when it is desired to use a differently shaped/sized pressing arm for performing a different welding operation, the mechanical fasteners 216 may be removed and the pressing arm 210 may be detached and replaced with a different pressing arm. The pressing arm 210 preferably is fabricated from a hard metal, such as for instance tool steel, or a ceramic material, for good wear resistance. Optionally, at least a portion of the pressing arm 210 is formed from a material that allows the pressing arm 210 to flex if an applied joining force exceeds a predetermined maximum joining force for the workpiece assembly that is being processed.

Alternatively, the mounting structure used to mount the pressing arm 210 in the apparatus 210 includes a mechanism for deflecting/retracting the pressing arm 210, or for otherwise limiting the joining force applied to the workpiece assembly that is being processed.

In at least some embodiments the apparatus 200 may include an optional force sensor 218 (shown using dashed lines in FIG. 2) for sensing a magnitude of the applied joining force. For instance, the force sensor 218 is mounted on the surface of 212 of the apparatus 200 to connect the robot end effector. The force sensor 218 is configured to monitor the applied joining force and to provide a feedback signal to the robot for use in adjusting the applied joining force. The feedback-based adjustment to the applied joining force may be used to avoid causing damage to the workpiece assembly due to the application of excessive force, or to vary the applied joining force as the pressing pad 208 is moved along a welding direction during the welding process, e.g., to accommodate structural and/or material property differences of the workpiece assembly along the welding direction.

Figure 3:
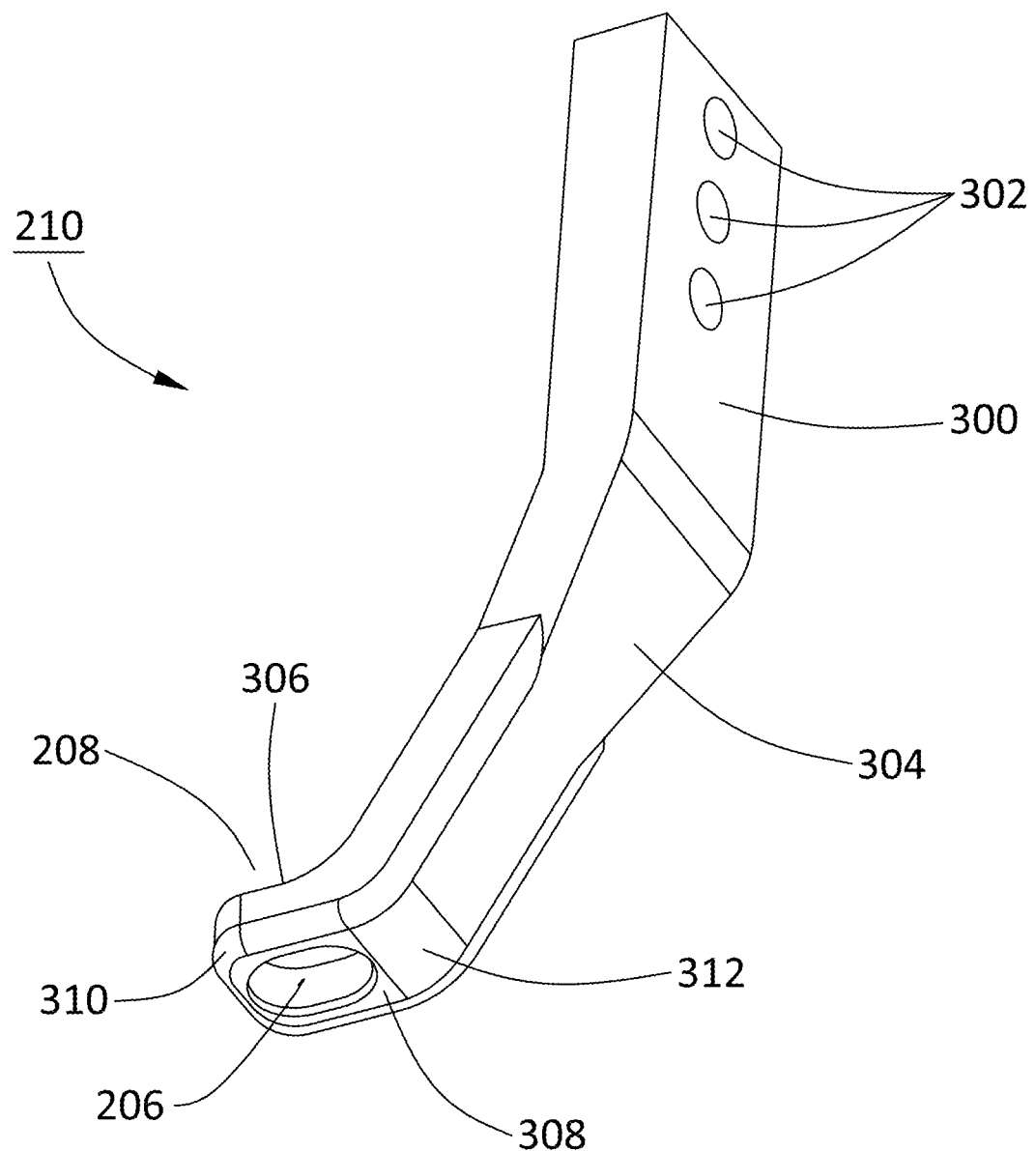
FIG. 3 is a simplified perspective view showing a pressing arm with pressing pad according to an embodiment.

Referring now to FIG. 3, shown is a perspective view of a pressing arm 210 according to an embodiment. At a mounting end thereof, the pressing arm 210 has a first arm portion 300 that is configured with a mounting structure 302 for detachably mounting the pressing arm in the apparatus 200. In the example that is shown in FIG. 3, the mounting structure 302 consists of three through-holes or openings for receiving machine bolts or other suitable mechanical fasteners. The pressing arm 200 also has a second arm portion 304 that is angled relative to the first arm portion 300. A pressing pad 208 is formed at the end of the second arm portion 304, and the opening 206 is defined through said pressing pad 208. The lengths of the first and second arm portions 300 and 304, and the angle that is formed therebetween, determines the fixed position of the pressing pad 208 relative to the optical unit 202 (not shown in FIG. 3).

Referring still to FIG. 3, the opening 206 is an airspace extending between an upper surface 306 and a lower surface 308 of the pressing pad 208. During use, the generally ring-shaped lower pressing surface 308 surrounding the opening 206 is pressed against the assembly of workpieces for applying the joining force 22. The pressing pad 208 has beveled edges 310 and a curved heel portion 312 between the lower surface 308 and the second arm portion 304, which eliminates sharp edges that could mark the surface of the workpiece assembly, and which additionally minimizes the total surface area of the lower surface 308 that is in contact with the surface of the workpiece assembly. The surface area, shape and smoothness of the lower surface 308 are configured or optimized in order to enhance the ability of the pressing pad 208 to be moved in a welding direction while continuously applying the joining force to the surface of the workpiece assembly that is being joined together.

Figure 4:
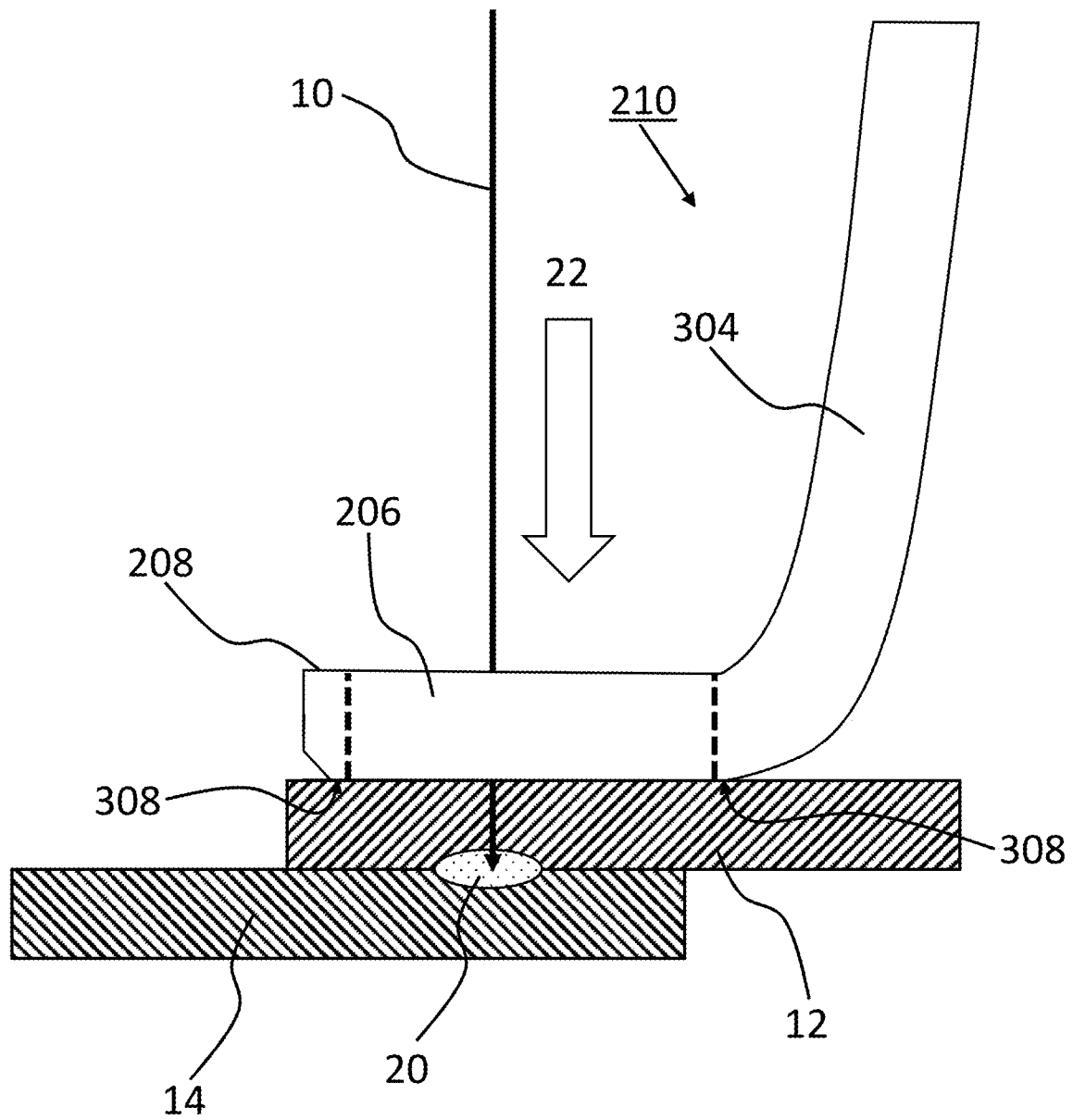
FIG. 4 is a simplified side view of the pressing arm of FIG. 3 during the welding together of two plastic workpieces.

FIG. 4 is a side view showing the pressing arm 200 of FIG. 3 during the welding together of two plastic workpieces. The joining force 22 is applied to the surface of workpiece 12 via the lower surface 308 of the pressing pad 208, which presses the workpieces 12 and 14 into close contact at joining location 20. At the same time, laser beam 10 passes through the opening 206 in the pressing pad 208 and then propagates through the workpiece 12 to impinge upon the surface of workpiece 14 in the joining location 20. Surface material from each of the workpieces 12 and 14 intermingles in the joining location 20 and forms a connection between the workpieces 12 and 14 upon cooling. Welding continues along the welding direction, which is perpendicular to the plane of the page in FIG. 4, with continuous application of the joining force. Optionally, the joining force is varied as the pressing pad 208 moves along the welding direction, such as for instance to accommodate structural and/or material property differences of the workpiece assembly along the welding direction.

Referring now to FIG. 5, shown is a perspective view of another pressing arm 210*a* according to an embodiment. At a mounting end thereof, the pressing arm 210*a* has a first arm portion 500 that is configured with a mounting structure 502 for detachably mounting the pressing arm 210*a* in the apparatus 200. In the example that is shown in FIG. 5, the mounting structure 502 consists of three openings for receiving machine bolts or other suitable mechanical fasteners. The pressing arm 210*a* also has a second arm portion 504 that is angled relative to the first arm portion 500. A pressing pad 506 is formed at the end of the second arm portion 504, and an opening 508 is defined through said pressing pad 506. In this example, an optical component in the form of a cylindrical lens 510 (shown in more detail in FIG. 6*a*) is mounted within the opening 508. The lengths of the first and second arm portions 500 and 504, and the angle formed therebetween, determines the fixed position of the pressing pad 506 relative to the optical unit 202 when the pressing arm 210*a* is mounted in the apparatus 200 of FIG. 2.

FIG. 6*a* shows the cylindrical lens 510 separately from the rest of the pressing arm 210*a*. The cylindrical lens 510 has a curved, polished surface 600, which protrudes out of the opening 508 and below the lower surface 512 of pressing pad 506, to define a generally curved contact or pressing surface. During use, the polished surface 600 of the cylindrical lens 510 is pressed against the assembly of workpieces for applying the joining force 22. The beam shaping optics of the optical unit 202 are designed to account for any focusing or other optical effects of the cylindrical lens 510.

Referring now to FIG. 6*b*, shown is an alternative optical component for being mounted within the opening 508 in the form of a lens 650 having a substantially planar, polished surface 652. In this example, the lens 650 is mounted within the opening 508 such that the polished surface 652 is flush with the lower surface 512 of pressing pad 506. During use, the polished surface 652 of the lens 650 and the lower surface 512 surrounding the opening 508 cooperate to form a pressing surface that is pressed against the assembly of workpieces for applying the joining force 22. The beam shaping optics of the optical unit 202 are designed to account for any focusing or other optical effects of the lens 650.

Figure 7A:
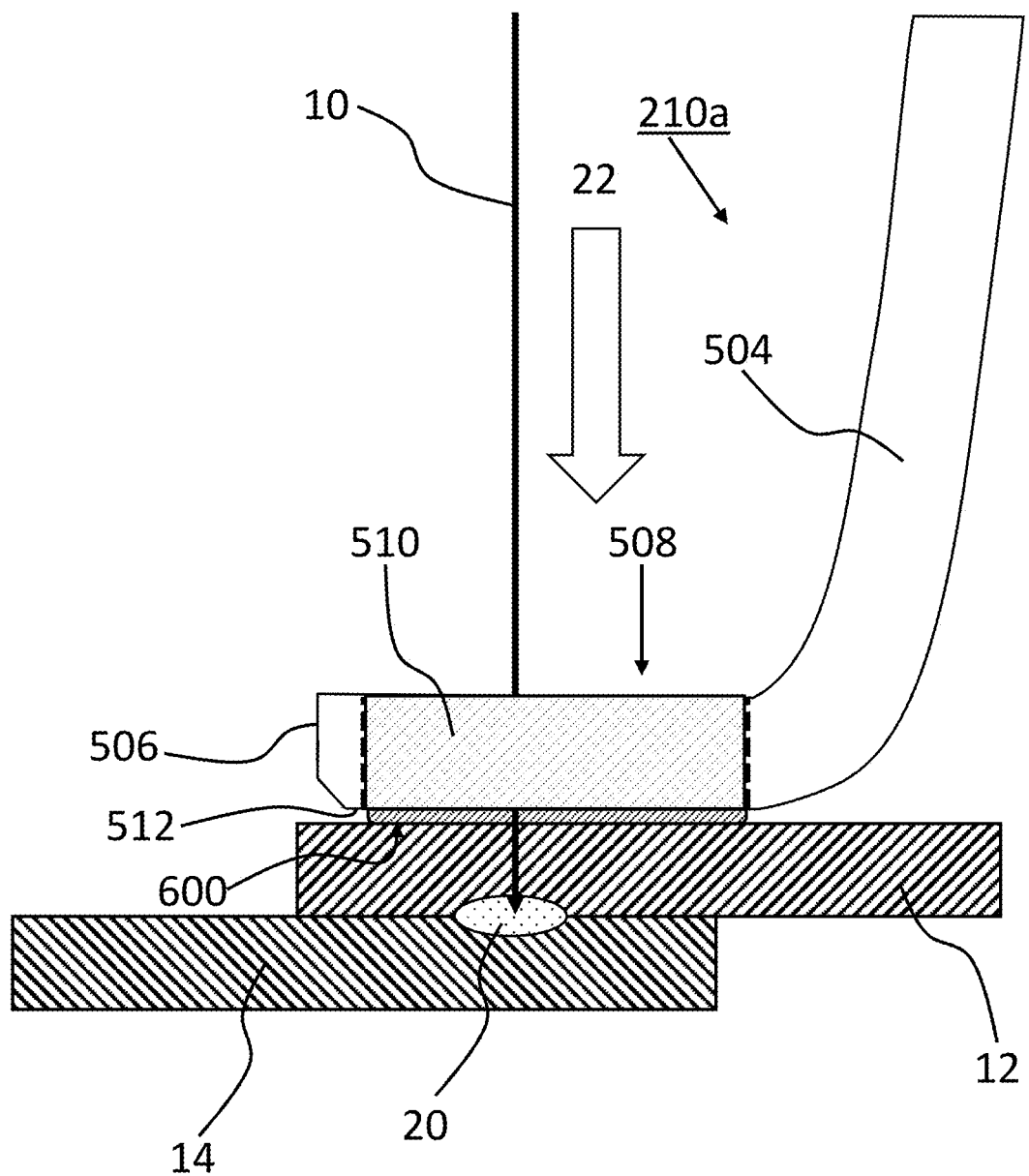
FIG. 7a is a simplified side view of the pressing arm of FIG. 5 with the cylindrical lens of FIG. 6a mounted in the opening of the pressing pad, during the welding together of two plastic workpieces.

FIG. 7*a* is a side view showing the pressing arm 210*a* of FIG. 5 during the welding together of two plastic workpieces. The joining force 22 is applied to the surface of workpiece 12 via polished surface 600 of the cylindrical lens 510 mounted within the opening 508 of the pressing pad 506, to press the workpieces 12 and 14 into close contact at joining location 20. At the same time, laser beam 10 passes through the cylindrical lens 510 mounted within the opening 508 and propagates through workpiece 12 to impinge upon the surface of workpiece 14 in the joining location 20. Surface material from each of the workpieces 12 and 14 intermingles in the joining location, forming a connection between the workpieces 12 and 14 upon cooling. Welding continues along a welding direction that is perpendicular to the plane of the page in FIG. 7.

Advantageously, the cylindrical lens 510 serves at least two purposes during a laser transmission welding operation. Firstly, it acts as an optical component to transmit the laser light to the location of the laser weld 20 in FIG. 1, which lies between the plastic workpieces that are being welded together. Secondly, the polished surface 600 serves as a contact surface for applying the joining force to the surface of one the plastic workpieces, so as to provide the clamping or joining force that is required to minimize the gap between the plastic workpieces and thereby enable the formation of a high-quality weld. The surface area, shape and smoothness of the polished surface 600 of the cylindrical lens 510 are configured or optimized in order to enhance the ability of the pressing pad 506 to be moved in the welding direction while continuously applying the joining force to the surface of the workpiece assembly that is being joined together. Optionally, the joining force is varied as the pressing pad 506 moves along the welding direction, such as for instance to accommodate structural and/or material property differences of the workpiece assembly along the welding direction.

Figure 7B:
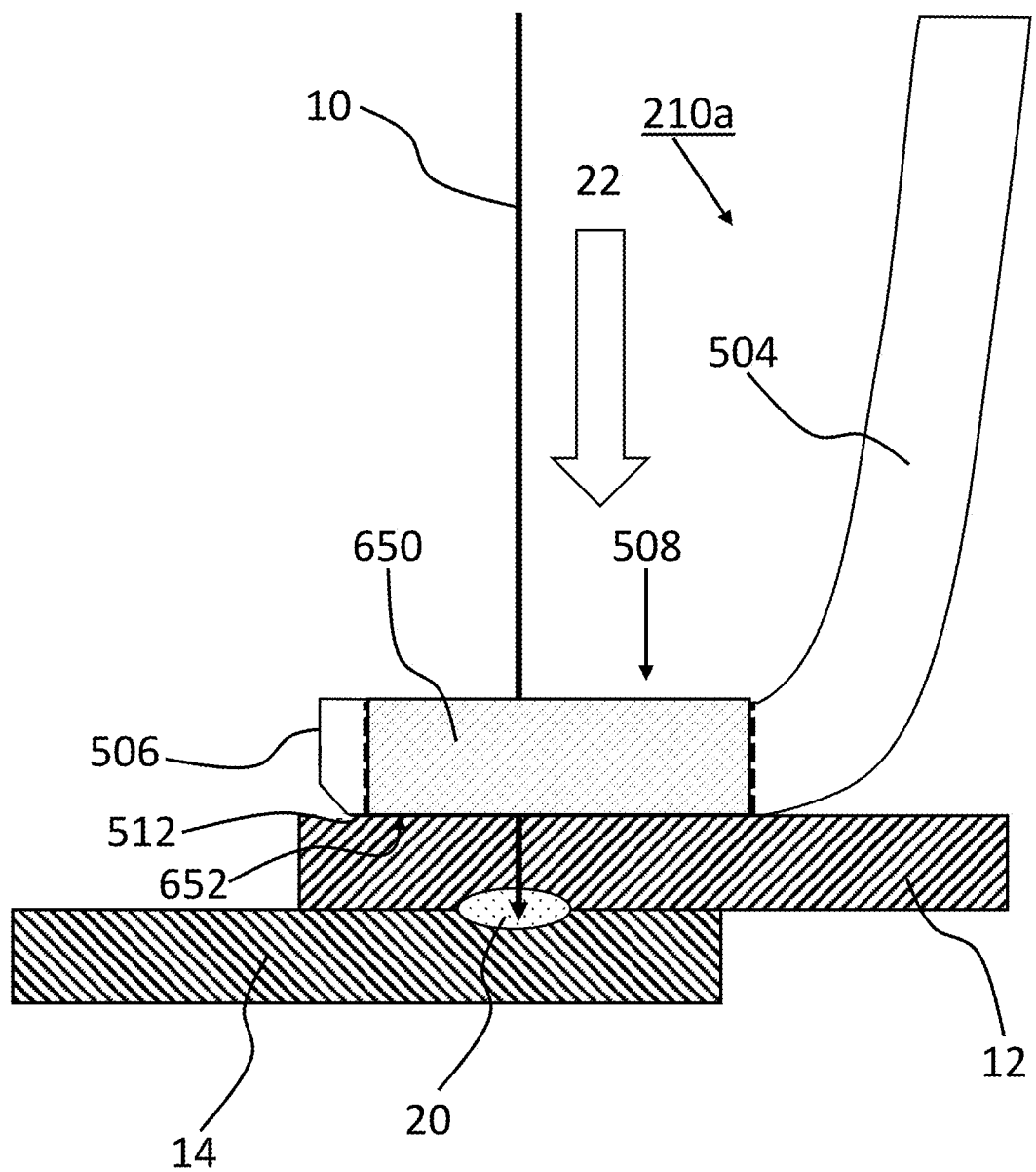
FIG. 7b is a simplified side view of the pressing arm of FIG. 5 with the lens of FIG. 6b mounted in the opening of the pressing pad, during the welding together of two plastic workpieces.

FIG. 7b is a side view showing the pressing arm 210a of FIG. 5 during the welding together of two plastic workpieces but with the alternative lens 650 mounted within the opening 508 of the pressing pad 506. Since the lens 650 is mounted within the opening 508 such that the polished surface 652 is flush with the lower surface 512 of pressing pad 506, the polished surface 652 of the lens 650 and the lower surface 512 surrounding the opening 508 cooperate to form a pressing surface that is pressed against the assembly of workpieces for applying the joining force 22, to press the workpieces 12 and 14 into close contact at joining location 20. At the same time, laser beam 10 passes through the lens 650 mounted within the opening 508 and propagates through workpiece 12 to impinge upon the surface of workpiece 14 in the joining location 20. Surface material from each of the workpieces 12 and 14 intermingles in the joining location, forming a connection between the workpieces 12 and 14 upon cooling. Welding continues along a welding direction that is perpendicular to the plane of the page in FIG. 7b.

Figure 8:
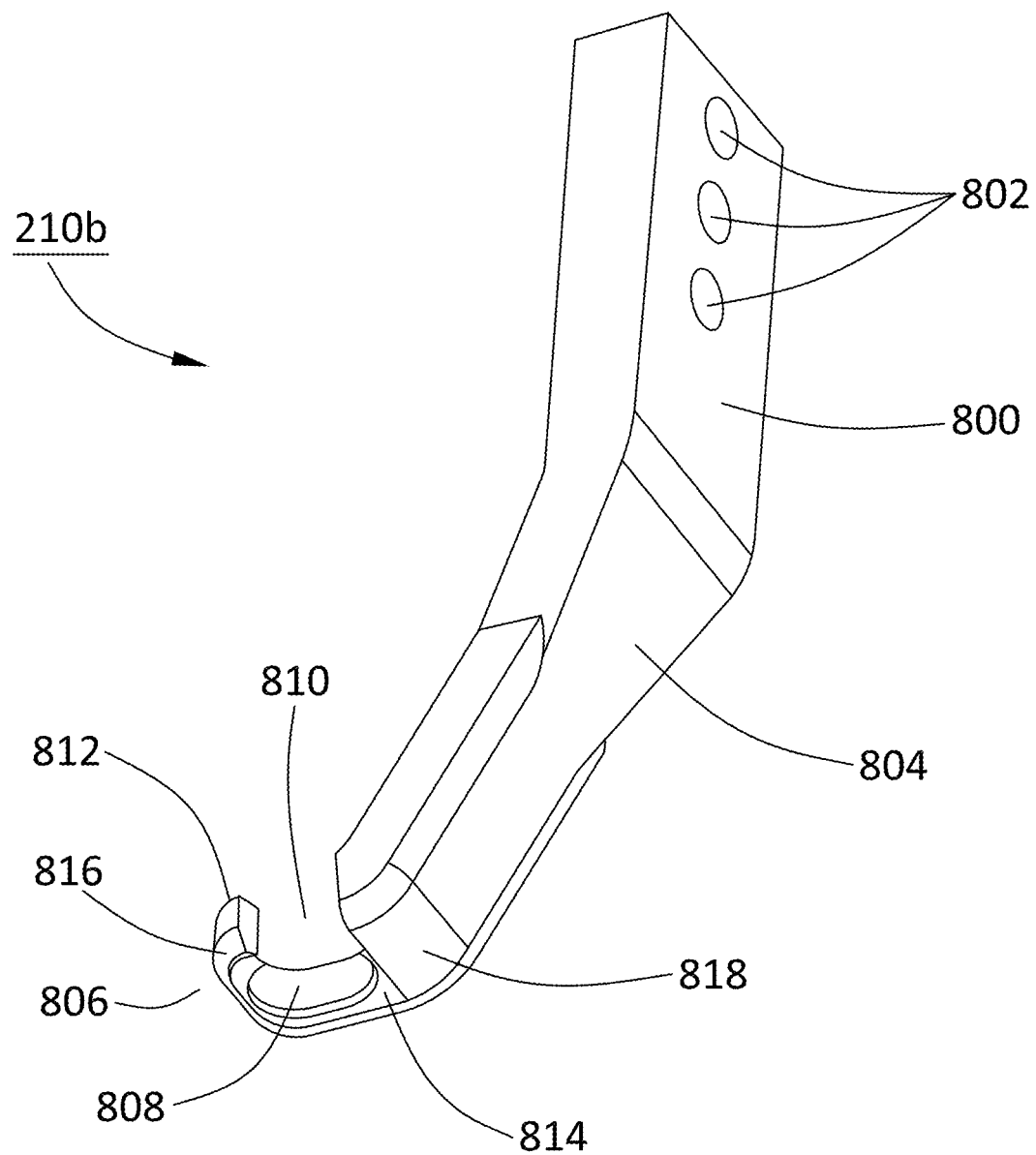
FIG. 8 is a simplified perspective view of a pressing arm with an open-sided pressing pad according to an embodiment.

Referring now to FIG. 8, shown is a perspective view of another pressing arm 210b according to an embodiment. The pressing arm 210b is suitable for use in the laser transmission welding of plastic workpieces as described in the preceding paragraphs, as well as for joining together other suitable materials such as for instance sheet-metal workpieces. In particular, the pressing arm 210b is adapted by providing a discontinuity in a pressing surface thereof to accommodate movement along a non-smooth surface of the workpieces, such as for instance a weld bead protruding above the surface of a sheet-metal workpiece formed during the welding process.

Figure 10:
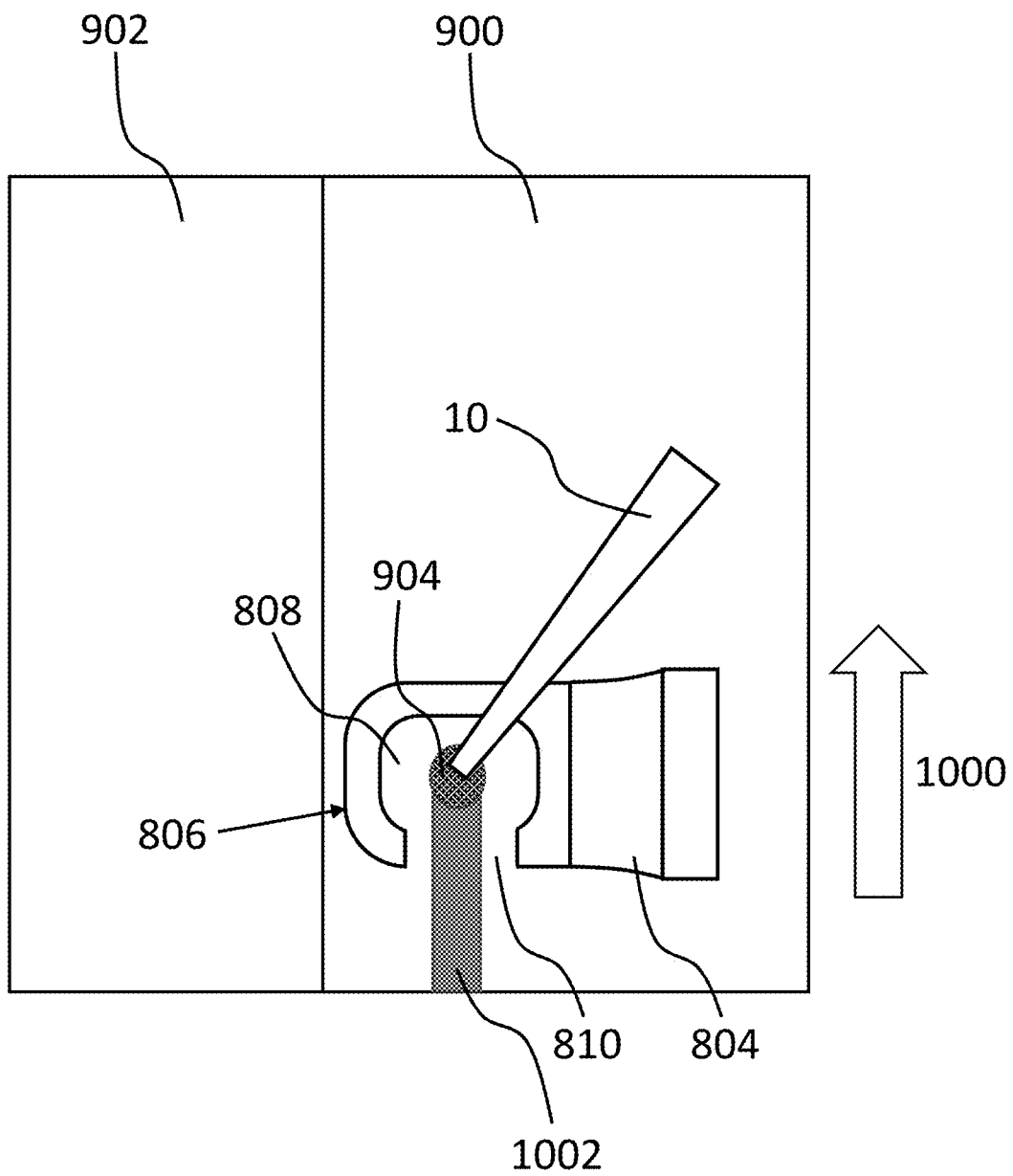
FIG. 10 is a simplified top view of the pressing arm of FIG. 8 during the welding together of two sheet-metal workpieces.

At a mounting end thereof, the pressing arm 210b has a first arm portion 800 that is configured with a mounting structure 802 for detachably mounting the pressing arm 210b in the apparatus 200 of FIG. 2. In the example that is shown in FIG. 8, the mounting structure 802 consists of three openings for receiving machine bolts or other suitable mechanical fasteners. The pressing arm 210b also has a second arm portion 804 that is angled relative to the first arm portion 800. A pressing pad 806 is formed at the end of the second arm portion 804, and an opening 808 is defined through said pressing pad 806. More particularly, the pressing pad 806 forms a non-continuous sidewall around the opening 808, such that a discontinuity in the form of a gap 810 is defined along one side of the pressing pad 806. The gap 810 is sized to be larger than the expected width of a weld bead that is to be formed during a welding operation, and results in the pressing pad 806 being generally C-shaped (as shown in FIG. 10) or even generally U-shaped. The lengths of the first and second arm portions 800 and 804, and the angle formed therebetween, determines the fixed position of the pressing pad 806 relative to the optical unit 202 when the pressing arm 210b is mounted in the apparatus 200 of FIG. 2.

Referring still to FIG. 8, the opening 808 is an airspace extending between an upper surface 812 and a lower surface 814 of the pressing pad 806. During use, the non-continuous but generally ring-shaped lower pressing surface 814 surrounding the opening 808 is pressed against the assembly of workpieces for applying the joining force 22. The pressing pad 806 has beveled edges 816 and a curved heel portion 818 between the lower surface 814 and the second arm portion 804, which eliminates sharp edges that could mark the surface of the workpiece assembly, and which additionally minimizes the total surface area of the lower surface 814 that is in contact with the surface of the workpiece assembly. The surface area, shape and smoothness of the lower surface 814 are configured or optimized in order to enhance the ability of the pressing pad 806 to be moved in a welding direction while continuously applying the joining force to the surface of the workpiece assembly that is being joined together.

Figure 9:
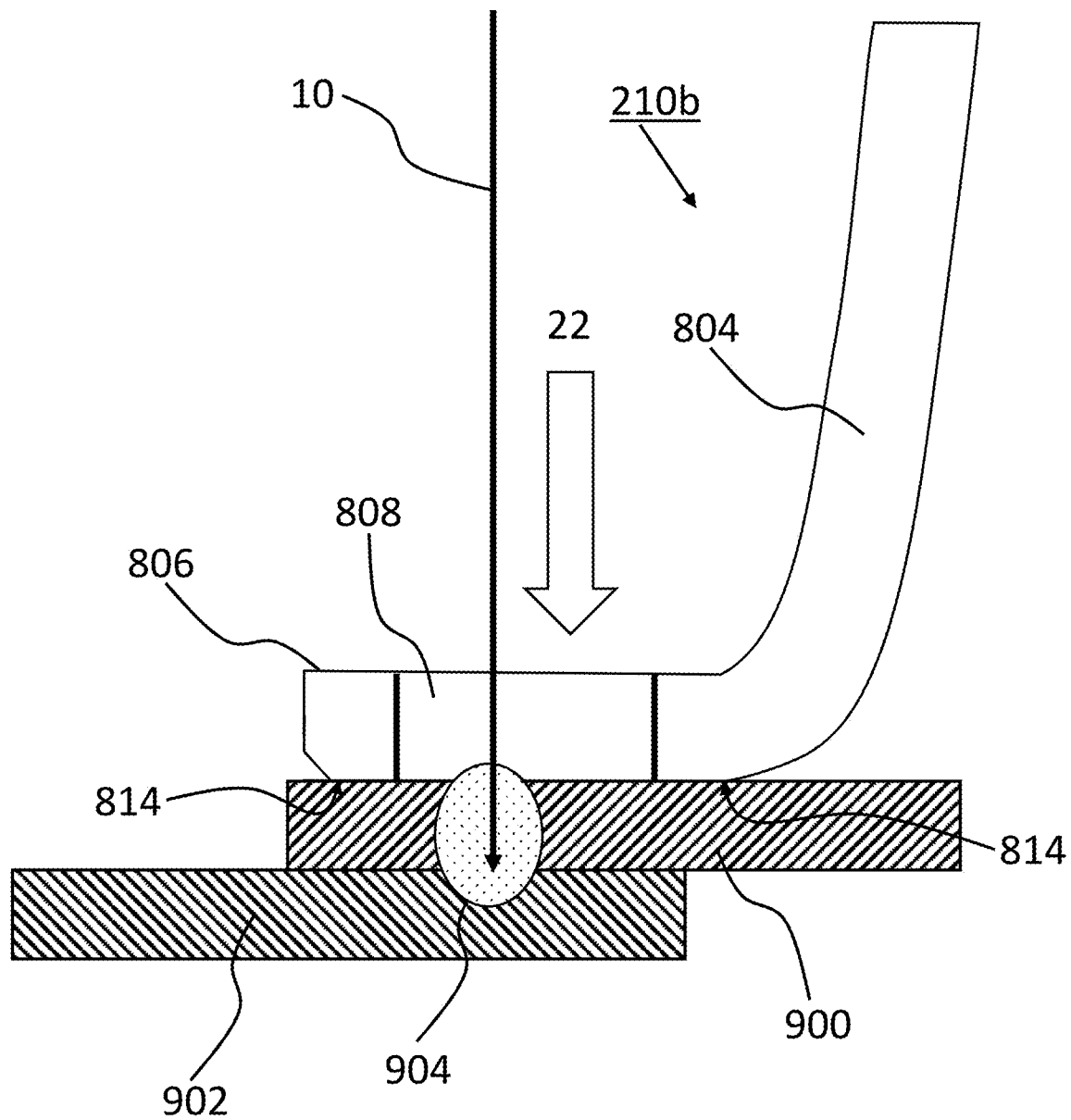
FIG. 9 is a simplified side view of the pressing arm of FIG. 8 during the welding together of two sheet-metal workpieces.

FIG. 9 is a side view showing the pressing arm 210b of FIG. 8 during the welding together of two sheet-metal workpieces 900 and 902. Of course, the pressing arm 210b also may be used for welding together two plastic workpieces. As is shown in FIG. 9, the joining force 22 is applied to the surface of workpiece 900 via the lower surface 814 of the pressing pad 806, which presses the workpieces 900 and 902 into close contact. At the same time, laser beam 10 passes through the opening 808 and creates a weld pool 904 containing material from both of the workpieces 900 and 902. Now referring also to FIG. 10, as welding continues along the welding direction indicated by block arrow 1000, a weld bead 1002 is formed and thereby the two workpieces 900 and 902 are joined together. The weld bead 1002 disrupts the surface of workpiece 900, causing a surface irregularity that would prevent the sliding movement of pressing pad 208 or 506 along the welding direction 1000. As is shown most clearly in FIG. 10, the gap 810 is sized and positioned within the pressing pad 806 such that the weld bead does not make contact with the pressing pad 806 as the pressing pad is advanced in the welding direction 1000. In particular, the gap 810 is arranged along the trailing edge of the pressing pad 806, which is the side of the pressing pad that trails the weld pool 904 during welding along the welding direction 1000.

Figure 11:
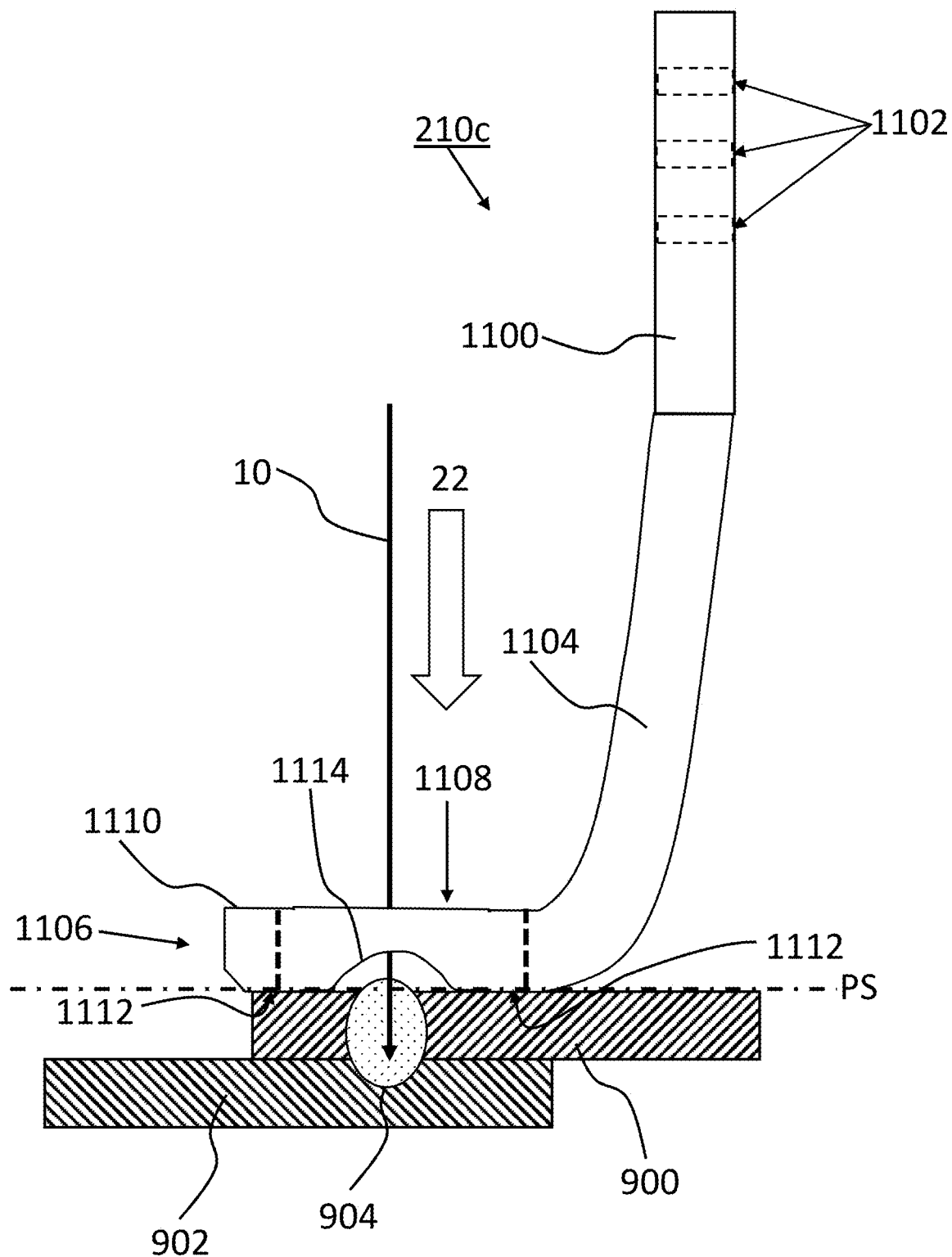
FIG. 11 is a simplified side view of a pressing arm with a pressing pad having a lower surface that has a discontinuity in the form of a channel-like recess during the welding together of two sheet-metal workpieces.

Referring now to FIG. 11, shown is a side view of another pressing arm 210c during the welding together of two sheet-metal workpieces 900 and 902. The pressing arm 210c has a first arm portion 1100 that is configured with a mounting structure 1102 for detachably mounting the pressing arm 210c in the apparatus 200 of FIG. 2. By way of a specific and non-limiting example, the mounting structure 1102 consists of three openings for receiving machine bolts or other suitable mechanical fasteners. The pressing arm 210c also has a second arm portion 1104 that is angled relative to the first arm portion 1100. A pressing pad 1106 is formed at the end of the second arm portion 1104, and an opening 1108 is defined through said pressing pad 1106. The opening 1108 is an airspace extending between an upper surface 1110 and a lower surface 1112 of the pressing pad 1106. The lengths of the first and second arm portions 800 and 804, and the angle formed therebetween, determines the fixed position of the pressing pad 1106 relative to the optical unit 202 when the pressing arm 210b is mounted in the apparatus 200 of FIG. 2.

The lower surface 1112 of the pressing pad 1106 has a discontinuity in the form of a channel-like recess 1114 defined therein, so as to form a non-continuous but generally ring-shaped lower pressing surface 1112. The pressing surface 1112 is contained within a single plane PS shown in FIG. 11, and as such the workpiece facing surface of the pressing pad 1106 within the channel-like recess is not part of the pressing surface 1112. The surface area, shape and smoothness of the lower pressing surface 1112 are configured or optimized in order to enhance the ability of the pressing pad 1106 to be moved in a welding direction while continuously applying the joining force to the surface of the workpiece assembly that is being joined together.

Figure 12:
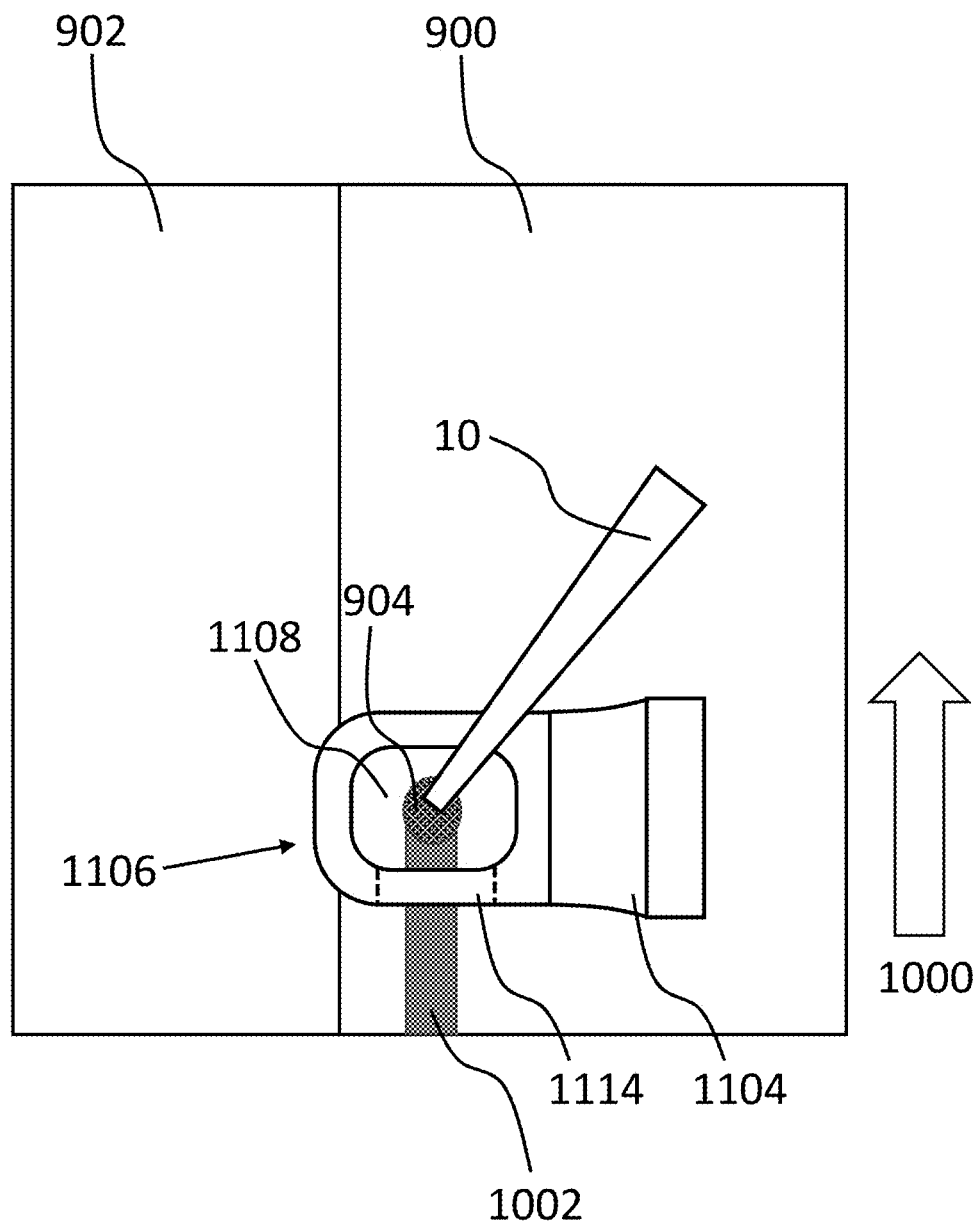
FIG. 12 is a simplified top view of the pressing arm with a pressing pad having a lower surface that has a discontinuity in the form of a channel-like recess during the welding together of two sheet-metal workpieces.

Now referring also to FIG. 12, the channel-like recess 1114 is sized to be larger than the expected width and height of a weld bead 1002 that is formed during a welding operation. During use, the joining force 22 is applied to the surface of workpiece 900 via the lower surface 1112 of the pressing pad 1106, which presses the workpieces 900 and 902 into close contact. At the same time, laser beam 10 passes through the opening 1108 and creates a weld pool 904 containing material from both of the workpieces 900 and 902. As welding continues along the welding direction 1000, a weld bead 1002 is formed and thereby the two workpieces 900 and 902 are joined together. The weld bead 1002 disrupts the surface of workpiece 900, causing a surface irregularity that would prevent the sliding movement of pressing pad 208 or 506 along the welding direction 1000. As is shown in FIG. 12, the channel-like recess 1114 is sized and positioned within the pressing pad 1106 such that the weld bead 1002 does not make contact with the pressing pad 1106 as the pressing pad is advanced in the welding direction 1000. In particular, the channel-like recess 1114 is arranged along the trailing edge of the pressing pad 1106, which is the side of the pressing pad that trails the weld pool 904 during welding along the welding direction 1000.

Figure 13:
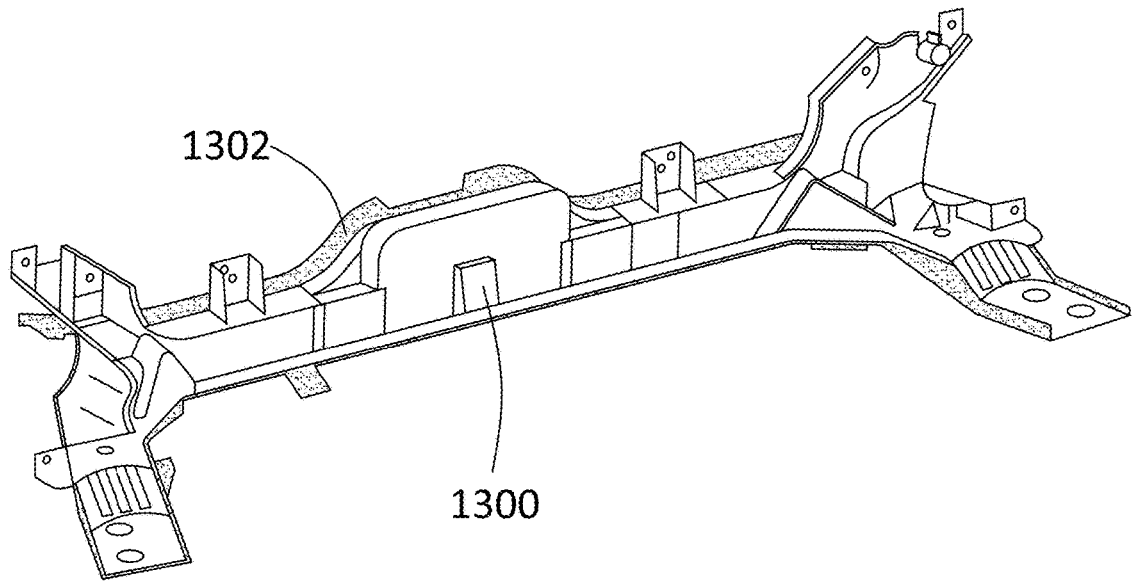
FIG. 13 is a perspective view of an assembly formed by joining together two thermoplastic parts.
Figure 14:
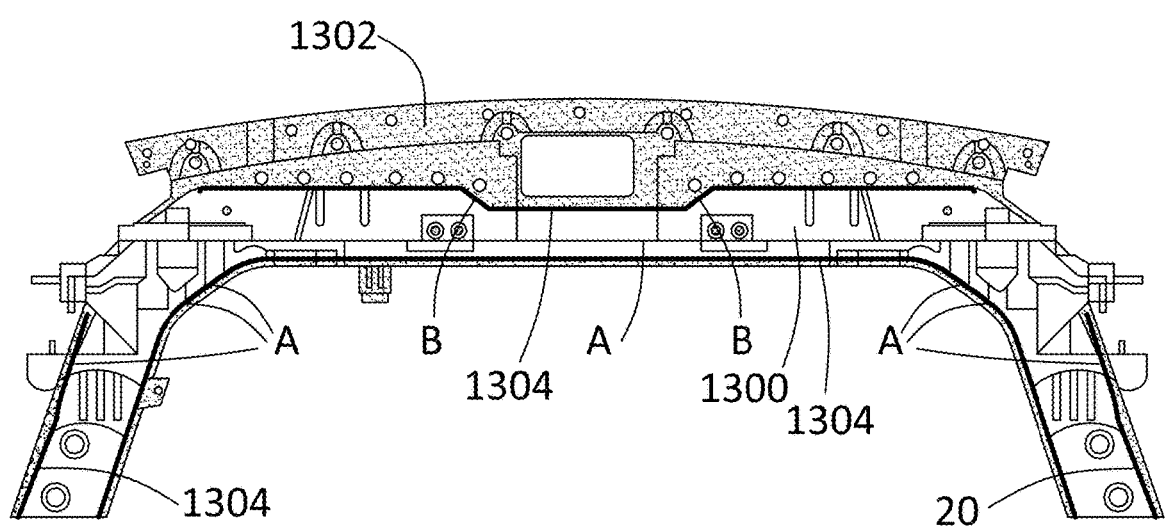
FIG. 14 is another view of the assembly of FIG. 13, showing the locations of welds that are formed during the joining operation.

FIG. 13 is a perspective view of an assembly formed by joining together two thermoplastic parts. Referring also to FIG. 14, the parts 1300 (e.g., IR-transparent) and 1302 (e.g., IR-absorbing) are joined together at joining locations 1304 that extend substantially continuously along the entire length of overlap between the two parts. The use of apparatus 200 described above, equipped with any one of the pressing arms 210, 210a, 210b or 210c, enables the joining locations 1304 to extend continuously as illustrated in FIG. 14 since complicated fixturing or clamping is not required. Additionally, the small size of the pressing pad that is used to apply the joining force, combined with the angled shape of the pressing arm, supports welding along the joining locations 1304 even within narrow overlap regions adjacent to protruding features of the workpiece 1300 (e.g., points "A" in FIG. 14) as well as through curved or otherwise non-linear regions (e.g., points "B" in FIG. 14). Other types of assemblies may be formed in a similar fashion using suitably shaped component parts fabricated from similar or dissimilar plastic materials, or using suitably shaped plastic and ceramic or metal component parts, etc.

Optionally, the pressing arm 210, 210a, 210b or 210c is designed to be flexible to compensate for inability to control application of force when the apparatus is mounted as an end effector of a robot. Advantageously, if a load applied to the workpiece assembly exceeds a predetermined threshold value then the pressing arm deflects in order to avoid pushing the pressing arm through the workpiece.

In the description herein, it is understood that a word appearing in the singular encompasses its plural counterpart, and a word appearing in the plural encompasses its singular counterpart, unless implicitly or explicitly understood or stated otherwise. For instance, unless the context indicates otherwise, a singular reference, such as "a" or "an" means "one or more". Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. It is also to be understood, where appropriate, like reference numerals may refer to corresponding parts throughout the several views of the drawings for simplicity of understanding.

Throughout the description and claims of this specification, the words "comprise", "including", "having" and "contain" and variations of the words, for example "comprising" and "comprises" etc., mean "including but not limited to", and are not intended to (and do not) exclude other components.

It will be appreciated that variations to the foregoing embodiments can be made while still falling within the scope of the appended claims. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example", "e.g." and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

What is claimed is:

1. A laser welding apparatus for welding together a workpiece assembly comprising a first workpiece that is arranged in an at least partially overlapping relationship with a second workpiece, the apparatus comprising:
   a laser optic unit for providing a beam of laser light for forming a weld joint between the first workpiece and the second workpiece in the workpiece assembly;
   an arm member having a pressing pad with an opening defined therethrough, the arm member being shaped such that the opening in the pressing pad is arranged at a known fixed distance from the laser optic unit to provide an optical path between the laser optic unit and the workpiece assembly, the pressing pad having a pressing surface on a workpiece-facing side thereof for applying a joining force to the workpiece assembly at the welding location during the laser welding; and
   means for moving the pressing pad in a welding direction relative to the workpiece assembly;

wherein at least one of a size, a shape and a smoothness of the pressing surface is configured to support a sliding-contact movement of the pressing surface along a surface of the workpiece assembly during simultaneous application of the joining force, wherein the arm member is fabricated from a wear-resistant material, and wherein at least a portion of the pressing surface is defined by a polished workpiece-facing surface of the wear-resistant material of the arm member, and wherein the pressing surface is contained in a single plane and extends around the opening with at least one discontinuity in said pressing surface, the at least one discontinuity arranged along a trailing edge of the pressing pad relative to the welding direction.

2. The laser welding apparatus of claim 1, wherein the wear-resistant material is a hard metal or a ceramic material.

3. The laser welding apparatus of claim 1, wherein the at least one discontinuity comprises a channel-like recess formed in the workpiece-facing surface of the wear-resistant material of the arm member, and wherein the channel-like recess provides clearance for a weld bead that is created during the laser welding.

4. The laser welding apparatus of claim 1, wherein the at least one discontinuity comprises a gap formed in the wear-resistant material of the arm member such that the pressing pad is generally U-shaped or generally C-shaped.

5. The laser welding apparatus of claim 1, comprising a mount for mounting the laser welding apparatus as an end effector of an articulated arm robot, and wherein the means for moving the pressing pad in the welding direction relative to the workpiece assembly is the articulated arm robot.

6. The laser welding apparatus of claim 5, comprising a linear actuator disposed between the mount and a sub-assembly that includes the laser optic unit, wherein the linear actuator is for extending and retracting the sub-assembly relative to the mount for controllably varying the joining force that is applied to the workpiece assembly.

7. The laser welding apparatus of claim 6, wherein the linear actuator is an air cylinder or a hydraulic cylinder.

8. A method, comprising:
arranging a first workpiece in an at least partially overlapping relationship with a second workpiece to form a workpiece assembly to be joined together;
applying a joining force at a welding location using a pressing device of a laser welding apparatus, the pressing device including an arm member having a pressing pad with an opening defined therethrough, the arm member being shaped such that the opening in the pressing pad is arranged at a known fixed distance from a laser optic unit of the laser welding apparatus to provide an optical path between the laser optic unit and the workpiece assembly, the pressing pad being fabricated from a wear-resistant material and having a pressing surface on a workpiece-facing side thereof for applying the joining force to the workpiece assembly at the welding location during the laser welding, at least a portion of the pressing surface being defined by a polished workpiece-facing surface of the wear-resistant material, and the pressing surface being contained in a single plane and extending around the opening with at least one discontinuity in said pressing surface;
during application of the joining force, irradiating the welding location by directing a beam of laser light from the laser optic unit toward the welding location via the opening in the pressing pad; and
moving the pressing pad relative to the workpiece assembly along a welding direction, with a sliding-contact movement between the pressing surface and a contact surface of the workpiece assembly, while simultaneously applying the joining force and irradiating, so as to form a connection between the first workpiece and the second workpiece along the welding direction,
further comprising controlling the relative movement between the pressing pad and the workpiece assembly such that the at least one discontinuity is arranged along a trailing edge of the pressing pad relative to the welding direction such that the at least one discontinuity provides clearance for a weld bead that is created on the workpiece assembly during the laser welding.

9. The method of claim 8, wherein each one of the first workpiece and the second workpiece is fabricated from a metallic or metallic alloy material, and wherein the laser beam forms a weld pool within which material from the first and second workpieces mix together to join the first workpiece and the second workpiece, the weld pool producing a weld bead along the contact surface of the workpiece assembly.

10. The method of claim 9, wherein the pressing surface remains in continuous contact with the contact surface of the workpiece assembly during the irradiating, so as to form a continuous connection between the first workpiece and the second workpiece along the welding direction.

11. A pressing device for a laser welding apparatus, comprising:
an arm member having a mounting end and an opposite pressing end, the pressing end defining a pressing pad having an opening extending therethrough for allowing a beam of laser light to impinge upon a workpiece assembly that is being pressed by the pressing device, the mounting end having a mounting structure for detachably securing the pressing device to the laser welding apparatus, the arm member being shaped to position the opening in the pressing pad at a known fixed distance from a laser optic unit of the laser welding apparatus, and the pressing pad having a pressing surface on a workpiece-facing side thereof for applying a joining force to the workpiece assembly at a welding location during the laser welding;
wherein at least one of a size, a shape and a smoothness of the pressing surface is configured to support a sliding-contact movement of the pressing surface along a surface of the workpiece assembly during application of the pressing force,
wherein the arm member is fabricated from a wear-resistant material, and wherein at least a portion of the pressing surface is defined by a polished workpiece-facing surface of the wear-resistant material of the arm member, and
wherein the pressing surface is contained in a single plane and extends around the opening with at least one discontinuity in said pressing surface, the at least one discontinuity, during laser welding, being arranged along a trailing edge of the pressing pad relative to a welding direction.

12. The pressing device of claim 11, wherein the at least one discontinuity comprises a channel-like recess formed in the workpiece-facing surface of the wear-resistant material of the arm member, and wherein the channel-like recess provides clearance for a weld bead that is created during the laser welding.

13. The pressing device of claim 11, wherein the at least one discontinuity comprises a gap formed in the wear-resistant material of the arm member such that the pressing pad is generally U-shaped or generally C-shaped.

* * * * *